United States Patent
Moriwake et al.

(10) Patent No.: US 6,845,002 B2
(45) Date of Patent: Jan. 18, 2005

(54) CERAMIC CAPACITOR AND METHOD OF MANUFACTURING THE SAME

(75) Inventors: Hiroki Moriwake, Hyogo (JP); Atsuo Nagai, Osaka (JP); Kazuhiro Komatsu, Hokkaido (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/473,367
(22) PCT Filed: Feb. 5, 2003
(86) PCT No.: PCT/JP03/01175
§ 371 (c)(1),
(2), (4) Date: Sep. 30, 2003
(87) PCT Pub. No.: WO03/069642
PCT Pub. Date: Aug. 21, 2003

(65) Prior Publication Data
US 2004/0100755 A1 May 27, 2004

(30) Foreign Application Priority Data
Feb. 13, 2002 (JP) ......... 2002-034943

(51) Int. Cl.[7] .................. H01G 4/35
(52) U.S. Cl. .......... 361/302; 361/303; 361/321.1; 361/321.5; 361/306.1; 361/306.3
(58) Field of Search .......... 361/302, 303, 361/321.1, 321.5, 321.4, 306.1, 306.3, 311, 313, 322, 321.2; 501/134, 138, 139

(56) References Cited

U.S. PATENT DOCUMENTS 5,862,034 A * 1/1999 Sato et al. ............ 361/321.5
6,303,529 B1 10/2001 Wada et al.
2003/0012727 A1 * 1/2003 Yoshikawa et al. ......... 423/598

FOREIGN PATENT DOCUMENTS

EP  1 056 102  11/2000

* cited by examiner

Primary Examiner—Dean A. Reichard
Assistant Examiner—Nguyen T. Ha
(74) Attorney, Agent, or Firm—Wenderoth, Lind & Ponack, L.L.P.

(57) ABSTRACT

In present invention, the c-axis/a-axis ratio is set in the range of 1.005 through 1.009 in a tetragonal-perovskite-type crystal structure of $BaTiO_3$. The present invention provides a ceramic capacitor having a large capacity and a method of manufacturing it.

3 Claims, 3 Drawing Sheets

US 6,845,002 B2

CERAMIC CAPACITOR AND METHOD OF MANUFACTURING THE SAME

TECHNICAL FIELD

The present invention relates to a ceramic capacitor and a method of manufacturing it.

BACKGROUND ART

This kind of ceramic capacitor includes a dielectric layer and electrodes disposed on obverse and reverse surfaces of the dielectric layer, respectively.

Increase in capacity is required for the ceramic capacitor, and therefore the dielectric layer must have a high dielectric constant. However, for downsizing the ceramic capacitor and increasing the capacity of it, the thickness of the dielectric layer must be 1 to 2 $\mu$m or less. In the ceramic capacitor employing the dielectric layer having the thickness of 1 to 2 $\mu$m or less, the dielectric constant can be presently increased only to about 3000. In other words, $BaTiO_3$ powder having minimum grain size must be used for forming the dielectric layer having thickness of 1 to 2 $\mu$m or less, but using the $BaTiO_3$ having such a small grain size decreases the dielectric constant rapidly. Therefore, at the present time, the dielectric constant can be increased only to about 3000.

DISCLOSURE OF THE INVENTION

A ceramic capacitor includes a dielectric layer made of polycrystal mainly composed of $BaTiO_3$ having an average grain size of 0.5 $\mu$m or less and electrodes disposed on obverse and reverse surfaces of the dielectric layer, respectively. The polycrystal has a tetragonal-perovskite-type crystal structure and a c-axis/a-axis ratio of 1.005 through 1.009. In a method of manufacturing the ceramic capacitor, an additive to $BaTiO_3$ is selected so that the c-axis/a-axis ratio of the polycrystal is 1.005 through 1.009.

DETAILED DESCRIPTIONS OF THE PREFERRED EMBODIMENT

The present invention provides a ceramic capacitor where the dielectric constant of a dielectric layer can be 3500 or more even when thickness of the dielectric layer is 1 to 2 $\mu$m or less, and a method of manufacturing the ceramic capacitor.

Embodiments of the present invention will be described hereinafter with reference to the accompanying drawings.

Figure 1:
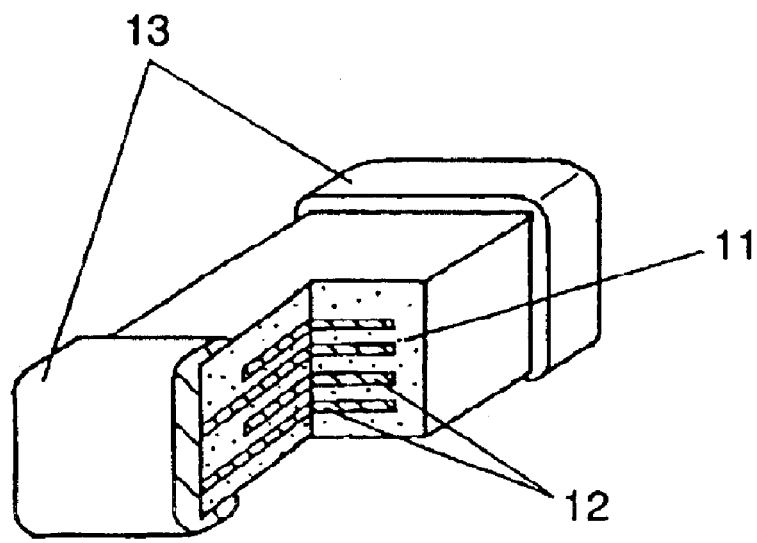
FIG. 1 is a partially-broken perspective view showing a ceramic capacitor in accordance with an exemplary embodiment of the present invention.

FIG. 1 shows a ceramic capacitor in accordance with an exemplary embodiment of the present invention. In FIG. 1, electrodes 12 are embedded at a predetermined interval in dielectric layer 11. Electrodes 12 are alternately pulled to respective ends and connected to respective external electrodes 13.

Thickness of dielectric layer 11 sandwiched between electrodes 12 and the crystal structure of them are important in the present invention. The ceramic capacitor of FIG. 1 has a small size and a large capacity, and the thickness of dielectric layer 11 between electrodes 12 is 1 to 2 $\mu$m. In other words, the thickness of dielectric layer 11 between electrodes 12 is decreased to face electrodes 12 to each other as closely as possible, thereby providing large electrostatic capacity.

For providing the large electrostatic capacity, dielectric constant of dielectric layer 11 sandwiched between mutually close electrodes 12 must be increased. Dielectric layer 11 is formed as follows in the present embodiment. Various additives are added to $BaTiO_3$ powder having the average grain size of 0.2 $\mu$m as a starting material The additives specifically include MgO, $MnO_2$, $Dy_2O_3$, $V_2O_5$, and Ba—Al—Si—O based glass. These materials are mixed, dried, calcined, and pulverized. The pulverized powder is mixed with various binders, and molded to form a sheet. This sheet is dielectric layer 11 to be sandwiched between electrodes 12.

Next, the sheets and electrodes 12 are alternately laminated, they are burned at 1200 to 1300° C. in that state, and then both end surfaces of them are shaved, thereby exposing electrodes 12 from the both end surfaces. External electrodes 13 are disposed on the exposing parts to form the ceramic capacitor of FIG. 1.

Figure 2:
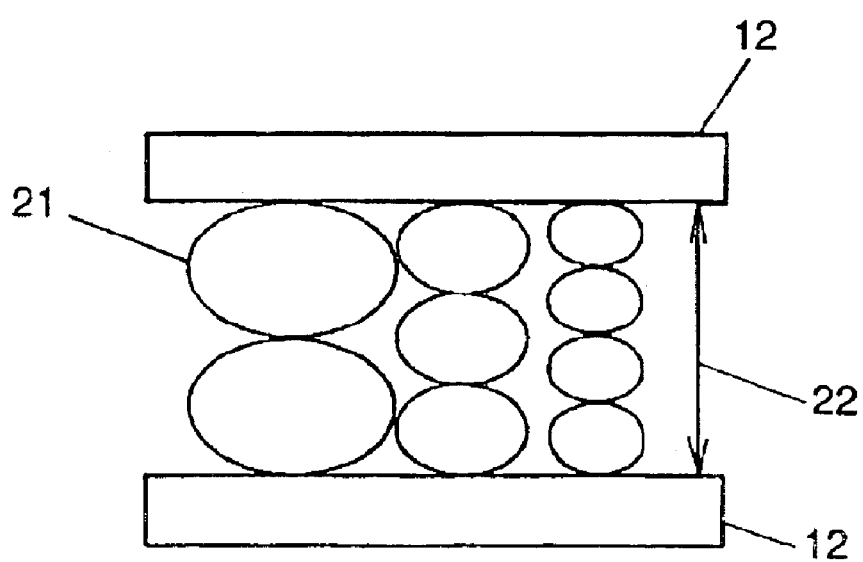
FIG. 2 is a pattern diagram showing internal electrodes and a dielectric layer of the ceramic capacitor of FIG. 1.

Important items in this case are then described with reference to FIG. 2. FIG. 2 is an enlarged pattern diagram showing electrodes 12 of FIG. 1 and dielectric layer 11 sandwiched by electrodes 12. Electrodes 12 in FIG. 2 correspond to electrodes 12 of FIG. 1, and crystal grains 21 in FIG. 2 correspond to the crystal grains in dielectric layer 11 of FIG. 1. Space 22 exists between electrodes 12. After burning, space 22 is filled with dielectric layer 11 having a width of scant about 1 to 2 $\mu$m, as shown in FIG. 2. Two, three, or four-tiers of crystal grains 21 having an average grain size of 0.5 $\mu$m or shorter are stacked in space 22 filled with dielectric layer 11 having the width of about 1 to 2 $\mu$m.

Figure 3:
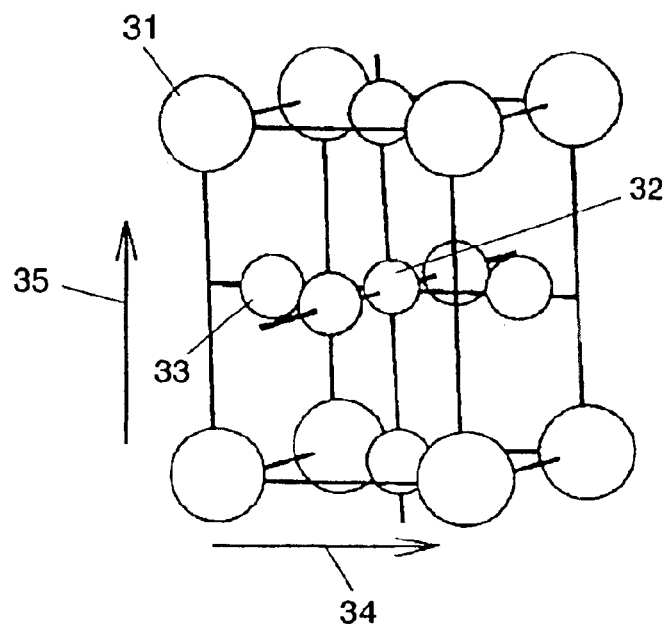
FIG. 3 shows a crystal structure of crystal grains constituting the dielectric layer of the ceramic capacitor of FIG. 1.

In the present embodiment, crystal grains 21 constitute a crystal structure shown in FIG. 3 even when the average grain size is 0.5 $\mu$m or less. In FIG. 3, barium atoms (Ba) 31, titanium atoms (Ti) 32, and oxygen atoms (O) 33 constitute each crystal grain 21 of FIG. 2. Arrow 34 and arrow 35 show two crystal axes, namely a-axis and c-axis, respectively. A c-axis/a-axis ratio of crystal grain 21 is controlled to be 1.005 through 1.009 by adjusting an amount of an additive, for example MgO, in FIG. 3.

Figure 4:
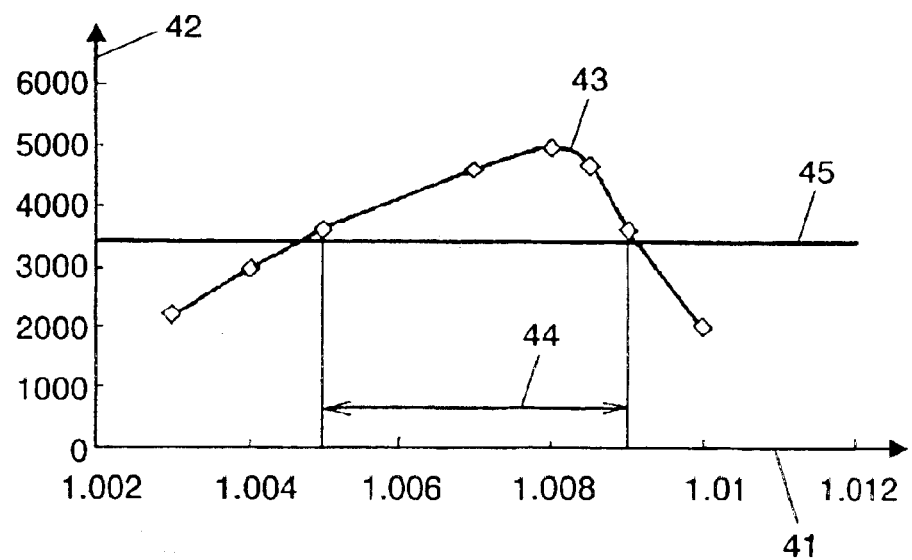
FIG. 4 is a characteristic diagram of the dielectric layer.

A conclusion is described with reference to FIG. 4. In FIG. 4, horizontal axis 41 shows the c-axis/a-axis ratio, and vertical axis 42 shows the dielectric constant. Straight line 45 shows dielectric constant of 3500, and polygonal line 43 indicates a relation between the c-axis/a-axis ratio and the dielectric constant. Arrow 44 shows the range from 1.005 through 1.009 in c-axis/a-axis ratio. We found that the dielectric constant of dielectric layer 11 between electrodes 12 can thus be 3500 or higher when c-axis/a-axis ratio 41 of crystal grain 21 is set in the range from 1.005 through 1.009. We found that the dielectric constant of no lower than 3500 can be obtained only when c-axis/a-axis ratio 41 of crystal grain 21 is set in range 44 from 1.005 through 1.009. The dielectric constant of 3500 cannot be achieved in the prior art. Based on the findings, we studied a selecting method of materials for obtaining the findings, a specific reason why the dielectric constant of no lower than 3500 can be obtained, and the like.

Figure 5:
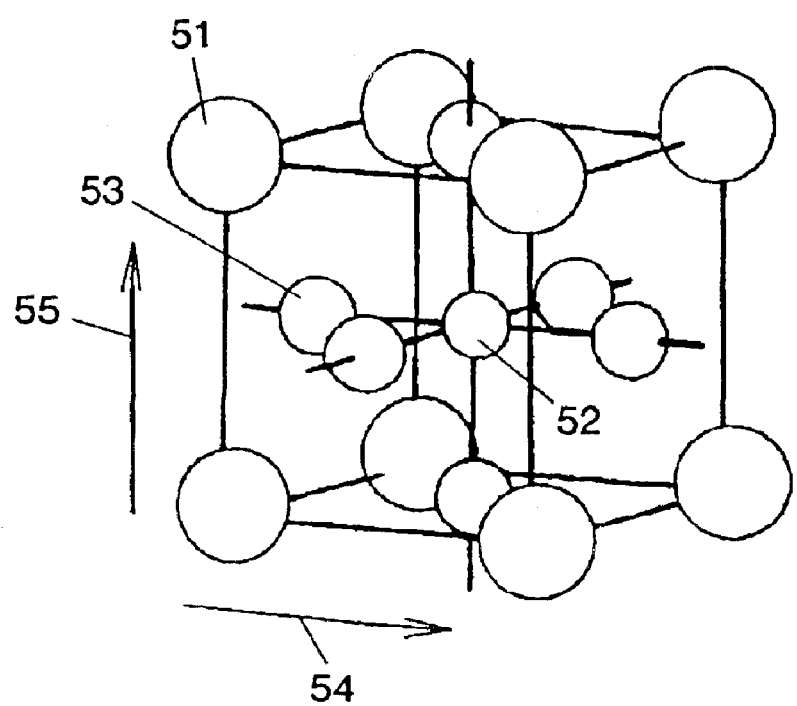
FIG. 5 shows a conventional crystal structure of crystal grains.

FIG. 5 shows a conventional crystal structure when the average grain size of crystal grains 21 is 0.5 μm or less. In FIG. 5, atoms 51, atoms 52, and atoms 53 indicate barium atoms (Ba), titanium atoms (Ti), and oxygen atoms (O), respectively. Arrow 54 and arrow 55 show two crystal axes, namely a-axis and c-axis, respectively. In the prior art, the c-axis/a-axis ratio is about 1.000, as shown in FIG. 5, when the average grain size of crystal grains 21 is 0.5 μm or less. The smaller the average grain size of crystal grains 21 is, the closer the c-axis/a-axis ratio is to 1.000. When the c-axis/a-axis ratio is close to 1.000, the dielectric constant is about 3000 at the highest, as shown in FIG. 4 and as in the prior art.

We earnestly studied how to obtain high dielectric constant largely exceeding 3000. As a result, it is found that controlling the amount of MgO for BaTiO$_3$ of 100 mol to be not more than 1 mol allows the c-axis/a-axis ratio to be set in the range from 1.005 through 1.009. In the prior art, for forming a ceramic capacitor, MgO of 2 mol or more is added to BaTiO$_3$ of 100 mol.

The reason why the c-axis/a-axis ratio can be set in the range from 1.005 through 1.009 cannot sufficiently be clarified presently, but the following mechanism is estimated. Reducing the amount of MgO results in generation of crystal grain 21 having no shell on the surface thereof in a core shell structure, stress applied to crystal grain 21 having the core shell structure enlarges c-axis value, and therefore the c-axis/a-axis ratio lies in the range from 1.005 through 1.009.

Dielectric constant of 3500 or higher (this cannot be conventionally achieved) can be achieved by setting the c-axis/a-axis ratio in the range from 1.005 through 1.009 (our selection), as shown in FIG. 4. Thus, a smaller ceramic capacitor with larger capacity can be obtained.

In the present invention, the c-axis/a-axis ratio is set in the range from 1.005 through 1.009 in the tetragonal-perovskite-type crystal structure of BaTiO$_3$, thereby providing the ceramic capacitor with a large capacity which cannot be conventionally obtained. For example, an extremely high dielectric constant of 3500 or higher can be obtained (it is conventionally difficult).

INDUSTRIAL APPLICABILITY

In the present invention, the c-axis/a-axis ratio is set in the range from 1.005 through 1.009 in a tetragonal-perovskite-type crystal structure of BaTiO$_3$, thereby providing a ceramic capacitor with a large capacity which cannot be conventionally obtained.

What is claimed is:

1. A ceramic capacitor comprising:

a dielectric layer made of polycrystal mainly composed of BaTiO$_3$ having an average grain size of 0.5 μm or less; and an electrode disposed on a surface of said dielectric layer, wherein the polycrystal has a tetragonal-perovskite-type crystal structure and a c-axis/a-axis ratio of 1.005 through 1.009.

2. A method of manufacturing a ceramic capacitor comprising:

using an additive to be added to BaTiO$_3$ so that a c-axis/a-axis ratio of a polycrystal is set in a range from 1.005 through 1.009, wherein the ceramic capacitor includes a dielectric layer made of the polycrystal mainly composed of the BaTiO$_3$ having an average grain size of 0.5 μm or less, and an electrode disposed on a surface of the dielectric layer; and wherein the polycrystal has a tetragonal-perovskite-type crystal structure.

3. A method of manufacturing the ceramic capacitor according to claim 2, wherein MgO is used as the additive, and an amount of the MgO for the BaTiO$_3$ of 100 mol is not more than 1 mol.

* * * * *